United States Patent [19]

Olsson et al.

[11] 4,157,735
[45] Jun. 12, 1979

[54] ENDWISE TRANSPORT STRUCTURE FOR DRILLS

[75] Inventors: Nils O. Olsson, Ancaster; William Flood, Burlington, both of Canada

[73] Assignee: International Harvester Company, Chicago, Ill.

[21] Appl. No.: 827,485

[22] Filed: Aug. 25, 1977

[51] Int. Cl.² ........................ A01B 63/22; A01B 73/00
[52] U.S. Cl. ........................................ 172/240; 111/54;
172/310; 172/328; 172/466; 172/538; 172/625
[58] Field of Search ............... 172/240, 244, 248, 310,
172/314, 315, 316, 318, 319, 326, 327, 328, 395,
396, 397, 398, 466, 467, 488, 538, 625, 674;
280/400, 414.5, 415 R, 415 A; 111/1, 53, 54, 55, 57

[56] References Cited
U.S. PATENT DOCUMENTS

| | | | |
|---|---|---|---|
| 2,580,100 | 12/1951 | Johansen et al. | 280/414.5 |
| 2,921,640 | 1/1960 | Roppel | 172/240 |
| 3,063,737 | 11/1962 | Coughran | 280/414.5 |
| 3,228,485 | 1/1966 | Ten Pas et al. | 172/538 |
| 3,913,683 | 10/1975 | Olsson et al. | 172/240 |
| 3,935,907 | 2/1976 | Riet | 172/314 |

*Primary Examiner*—Richard T. Stouffer
*Attorney, Agent, or Firm*—Neal C. Johnson; F. David AuBuchon

[57] ABSTRACT

A plurality of grain drills are coupled together in end-to-end relation for towing behind a tractor for operation and alternately in an endwise direction for transport. Each drill is supported in field operation by a forward caster wheel and a plurality of side-by-side gangs of press wheels disposed along the rear of the drill. The drills are coupled to the tractor for operation by duplex (or triplex) hitch structure. For endwise transport an endmost drill is provided with a hitch swingable to a transport position for coupling to the tractor. A single transport wheel is mounted on the rear of this drill for movement to a position providing endwise transport. A press wheel gang lock mechanism is arranged for movement to a position locking the gangs against downward movement in response to swinging the endwise hitch to its transport position. This leading drill is thus supported in transport by the front caster wheel, the transport wheel, and the tractor through the endwise hitch.

The second and subsequent drills are each provided with two transport wheels at the rear of the drill arranged for movement to a lowered transport position wherein the drill is supported for transport by these transport wheels and the front-mounted caster wheel. A press wheel gang lock mechanism is arranged on each of these drills for movement to a position locking the gangs against downward movement in response to moving the transport wheels to their lowered transport positions.

9 Claims, 7 Drawing Figures

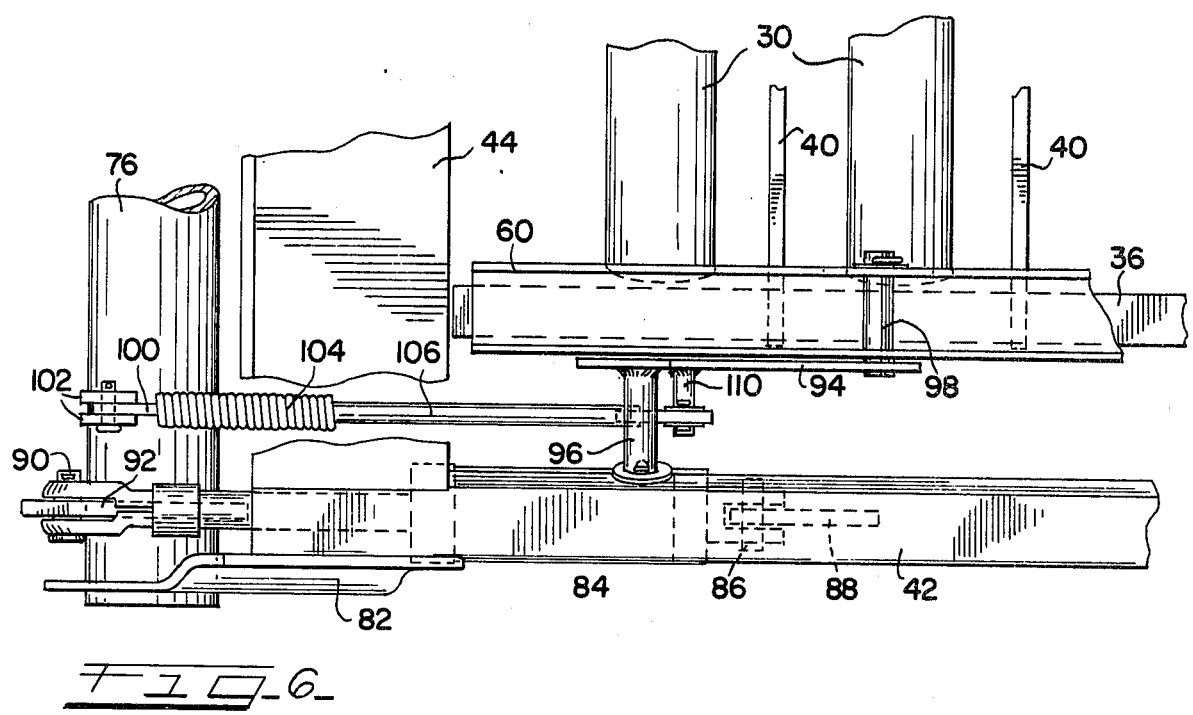
FIG_6_
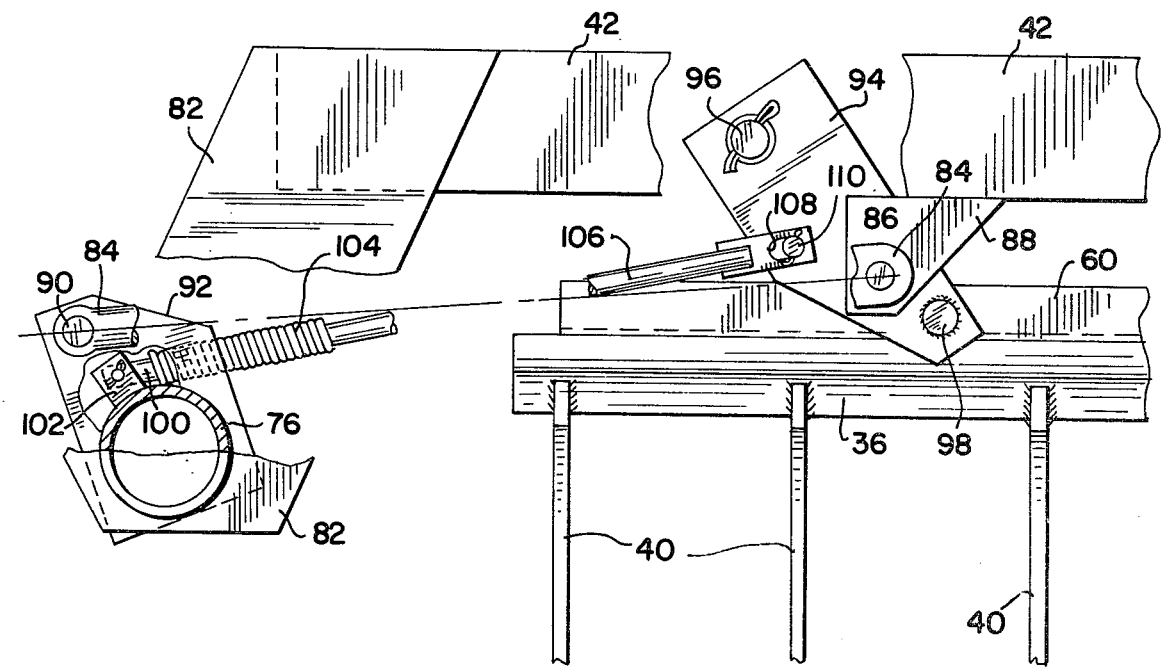
FIG_7_

ENDWISE TRANSPORT STRUCTURE FOR DRILLS

BACKGROUND OF THE INVENTION

1. Field of the Invention

The invention relates generally to towing implements in operation and transport and more particularly to a system for towing one or more grain drills in endwise transport.

2. Prior Art

Agricultural type implements such as grain drills for example are characteristically designed of substantial lengths transverse to the normal direction of travel so as to cover as much ground as practical during each pass of the implement across the field. The trend in recent years has been to interconnect similar units in end-to-end relation to greatly increase the total area covered during each pass.

A basic problem encountered with such implements is designing a simple and effective means facilitating transport along narrow roadways or through narrow gates as the implement is moved from field to field.

The art is repleat with examples of systems for towing one or more implements in endwise direction for transport such as U.S. Pat. Nos. 3,935,907 and 3,913,683 and art cited therein.

A particular problem associated with the transport of press wheel type grain drills has not been referred to or solved by any of the art known to Applicants. In essence the problem is evidenced in the endwise transport of grain drills having a plurality of gangs of press wheels normally movable up and down relative to each other to accommodate uneven ground during seeding. Specifically, some of the gangs may be heavier than others and thus shift downwardly when the drill is raised in endwise transport. The press wheels of such a gang would be severely damaged if dragged on the ground during transport. While it is of course clear that every ground working or engaging implement must be held in raised position for transport, no art is known which relates to the press wheel transport problems set out above.

A further problem associated with systems for converting one or more implements between operating or transport modes resides in the time and effort which such conversion may required.

SUMMARY

The invention relates to a transport system for one or more grain drills of the type having two or more relatively moveable gangs of press wheels. The invention provides a simple and quick system for converting the drill or drills from operating condition to endwise transport while ensuring that the press wheels will be retained above ground contact while in the transport mode. More specifically, in one enbodiment of the invention the lead drill in transport is provided with a hitch when moved into its transport position causes the gangs of press wheels to be automatically locked out of ground contact. In a second embodiment the next adjacent drill includes a pair of transport wheels which when moved into their transport position cause the gangs of press wheels to be locked in the same manner as the lead drill. The invention also includes the novel combination of the lead drill and the second or subsequent drills coupled to form a "train" in endwise transport.

The invention solves the problem of damage to the press wheels by ground contact during transport by positively retaining the press wheel gangs above the ground. This may be accomplished quickly and easily due to the interrelationship of the means for locking the gangs and the means for moving the transport wheels (or the endwise hitch) to the transport positions. That is, the gangs are locked automatically and virtually simultaneously in response to powered movement of the hitch and transport wheels to their transport positions.

Briefly, the objects of the invention are to provide a drill transport system which: enables one or more end-to-end connected drills to be towed in endwise transport; locks or retains the press wheels of the drills out of ground contact during transport thus preventing damage thereto; and enables the drill or drills to be quickly changed between operating and transport modes.

BRIEF DESCRIPTION OF THE DRAWINGS

FIG. 6 is a fragmentary enlarged plan view of the hitch actuating and locking mechanism of FIGS. 1 and 2; and FIG. 7 is a fragmentary elevation view of the structure of FIG. 6.

DESCRIPTION OF THE PREFERRED EMBODIMENT

Figure 1:
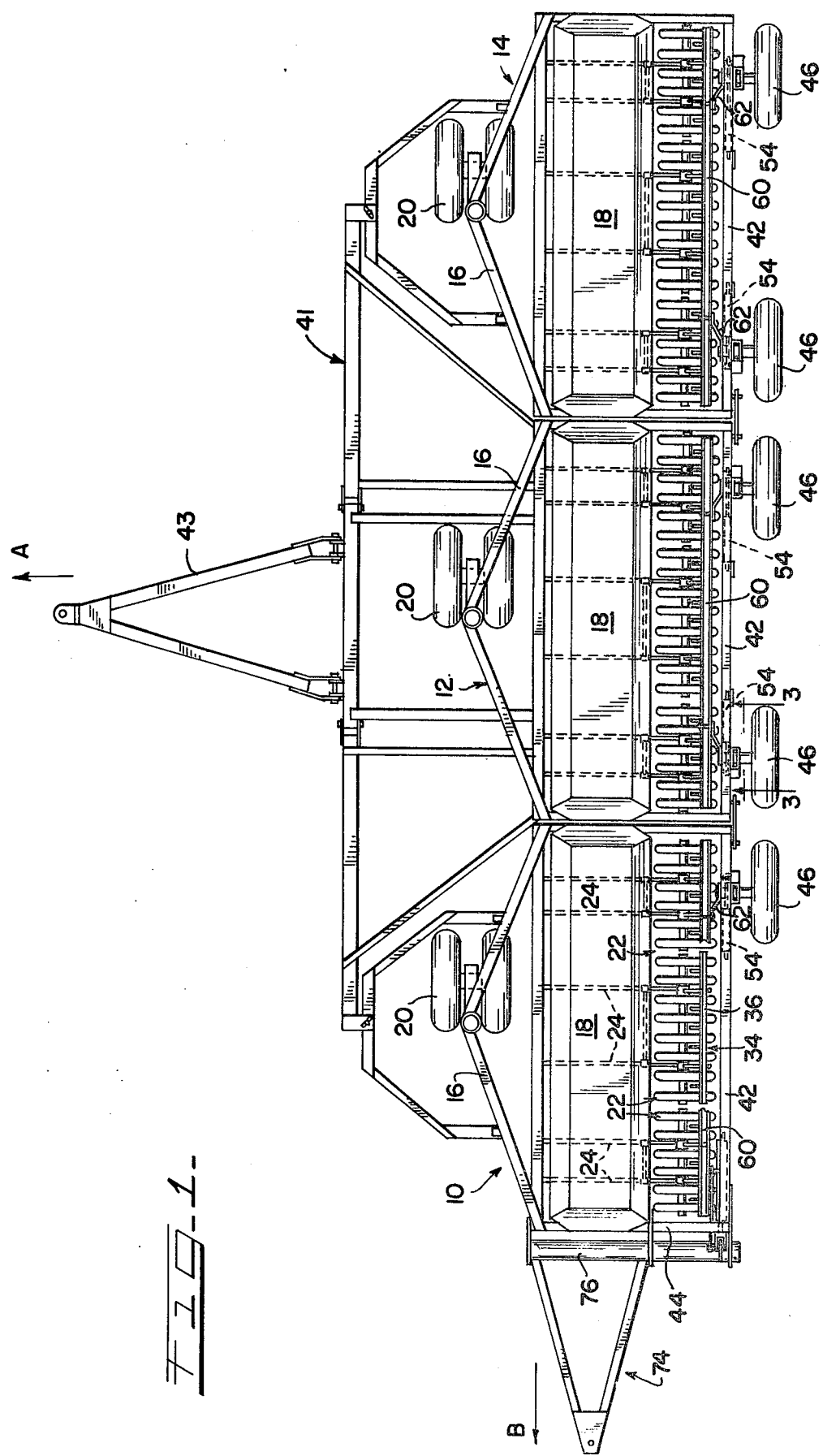
FIG. 1 is a plan view of a three drill unit embodying the endwise transport system of the invention.
Figure 2:
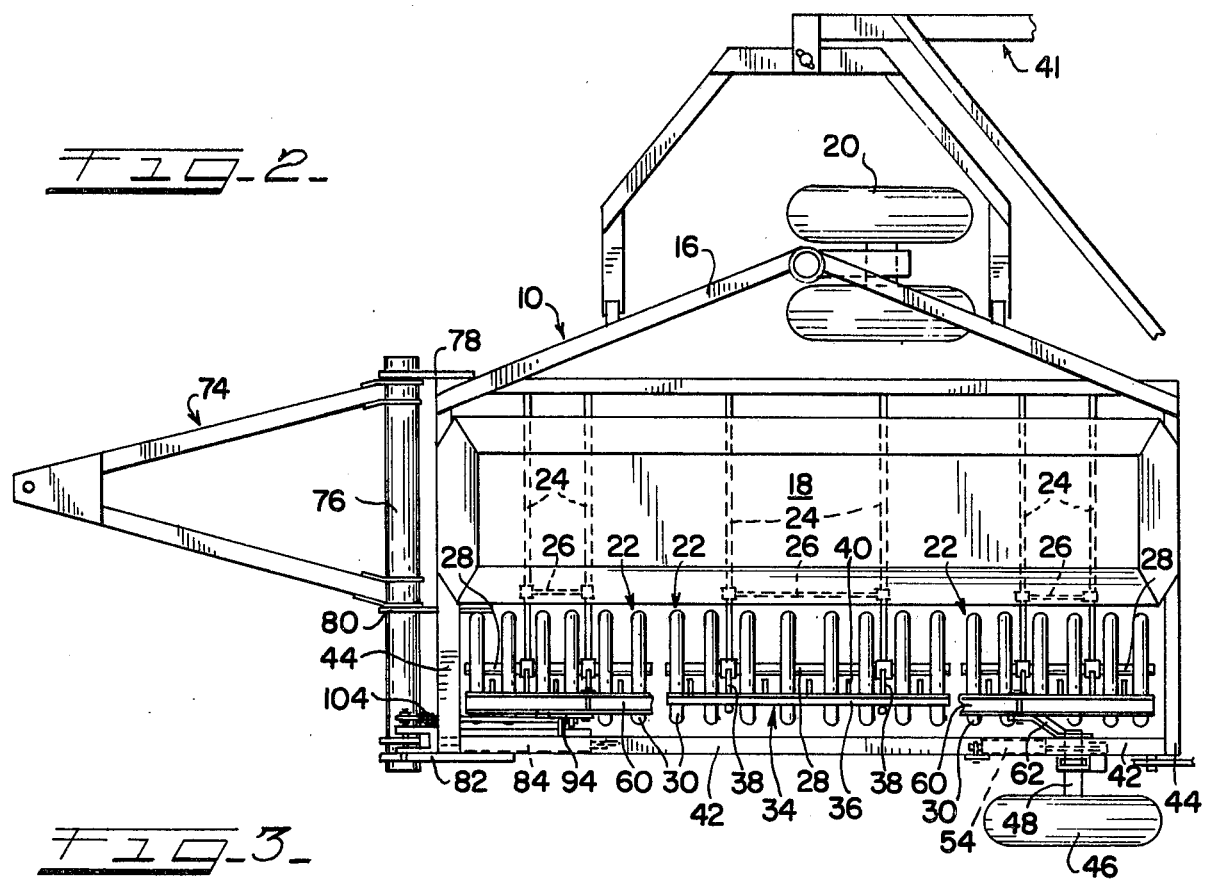
FIG. 2 is an enlarged plan view of the leading drill in endwise transport.

Referring first to FIG. 1 there are shown three conventional grain drills 10, 12, and 14 of the so-called press type for seeding crops such as grain and the like. Each of the drills includes a generally horizontally disposed framework 16 which supports an elongated hopper 18 for gravity feeding of seeds to suitable ground-opening and planting units (not shown) suspended from the framework. As best shown in FIG. 2 each of the drills includes a forwardly and centrally disposed caster wheel unit 20 and a plurality of press wheel gangs 22. Each press wheel gang 22 includes a pair of drawbars 24 pivotally connected to the forward portion of the framework 16 and extending rearwardly beneath the hopper 18. The two drawbars 24 of each gang are interconnected by a so-called evener bar 26. An axle 28 is journalled on the rear ends of the draw bars 24 of each gang 22. A plurality of transversely spaced press wheels 30 is secured to the axle 28 of each gang 22 so as to be disposed in alignment along the rear of each drill. In normal operation it will be apparent that each drill 10, 12, and 14 is supported by the respective caster wheel unit 20 and the respective press wheels 30. In accordance with conventional practice the gangs 22 are interconnected for relative up and down movement in field operation by a linkage system shown partially in FIG. 5. A pair of so-called equalizer tubes 32 is pivotally mounted at their mid points on the rear of the framework 16. The ends of the tubes 32 are pivotally connected to the evener bars 26 which are disposed beneath the tubes 32. The gangs are thus interconnected such that downward movement of one gang results in upward movement of an adjacent gang.

Each of the press wheel gangs 22 further includes a so-called "stone kicker attachment" 34 which functions to prevent the buildup of dirt or stones between the spaced press wheels 30. As shown generally in FIG. 2 each attachment 34 includes an elongated angle member 36 secured to the axle 28 by a pair of upwardly and rearwardly inclined support rods 38. Each of the angle members 36 is disposed horizontally above the press wheels 30 of the respective gang 22 and serves as a mounting member for a plurality of teeth 40 projecting downwardly and forwardly between the press wheels 30.

Referring again to FIG. 1 the drills 10, 12, and 14 are coupled in end-to-end relation by a multiple-drill hitch 41 of conventional construction. The hitch 41 includes an operating hitch unit 43 adapted for coupling to a tractor for towing the drills in operation in the direction of arrow A.

In accordance with the invention means are provided for towing the drills in an endwise direction for transport (arrow B). Each of the drills is modified to include an elongated beam 42 extending along the transverse length of the drill just rearwardly of the press wheels 30. The beam 42 is rigidly secured to a pair of fore-and-aft extending frame elements 44 secured to opposite ends of the framework 16 of each drill.

Figure 3:
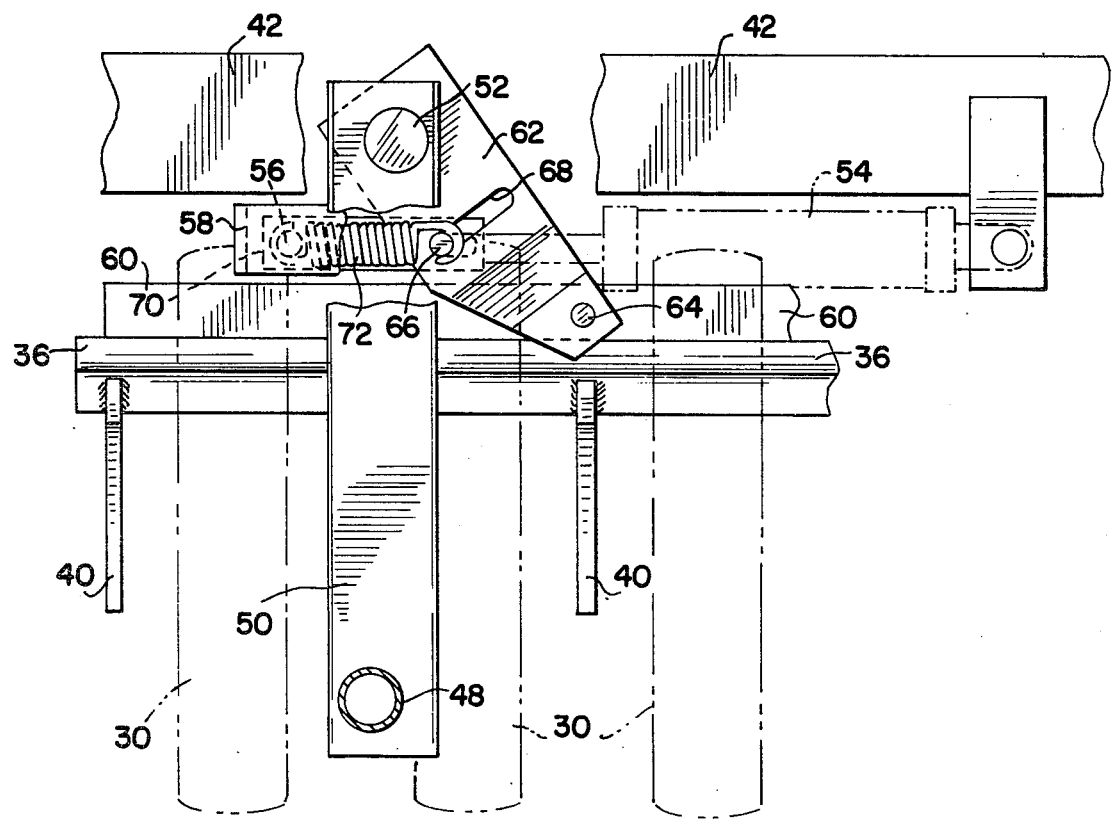
FIG. 3 is an enlarged fragmentary cross section taken in the direction of arrows 3—3 of FIG. 1.
Figure 4:
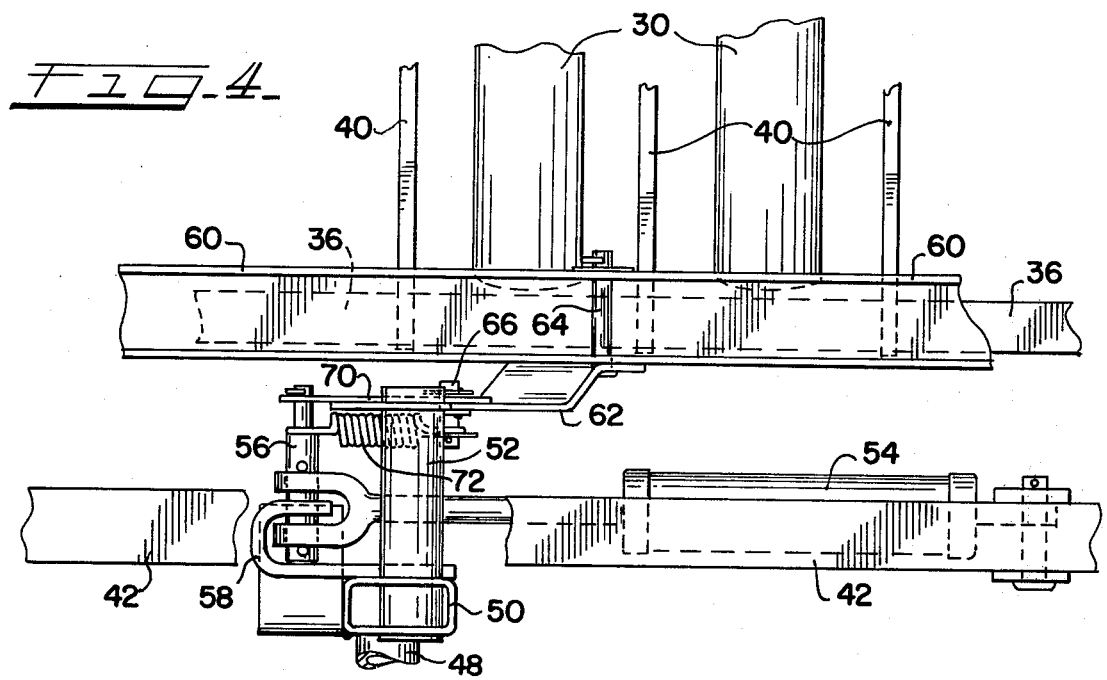
FIG. 4 is a fragmentary elevation view of the structure of FIG. 3.

The beam 42 serves as the basic structural member to which transport wheels 46 are connected. As shown generally in FIG. 1 drills 12 and 14 each include two transport wheels 46 while the drill 10, which is the leading drill in endwise transport, has only one transport wheel 46. Each wheel 46 is journalled on an axle 48 secured to the lower end of a wheel arm 50. The arm 50 is secured on a pin 52 journalled through the beam 42 enabling each wheel 46 to be swung between a raised position for drill operation and a lowered position in ground-contact to support the drills in endwise transport. Each transport wheel 46 is power-shiftable between the raised and lowered positions by a hydraulic cylinder 54 best shown in FIGS. 3 and 4 pivotally connected at its cylinder end to the underside of the beam 42. The rod end of the cylinder 54 is pivotally connected to a pin 56 retained in a C-shape member 58 welded to the wheel arm 50. The member 58 also serves as a stop engageable with the underside of the beam 42 when the wheel arm 50 is in its lowered position for transport.

The invention further includes means for locking or retaining the press wheel gangs 22 out of ground-contact in endwise transport of the drills. As shown in the overall view of FIG. 1 an elongated lock member 60 of channel-section is disposed along the beam 42 directly above the angle members 36 of each drill. In drills 12 and 14 the respective lock members 60 are supported by a pair of support arms 62 disposed in mirror-image relation to each other. As shown specifically in FIGS. 3 and 4 the support arm 62 is journalled at its upper end on the pivot pin 52 of the proximate transport wheel 46. The support arm 62 is offset forwardly (FIG. 4) and at its lower end is connected to a pin 64 which extends through slots (not shown) defined through the flanges of the channel-section lock member 60. Thus it will be seen that the lock member 60 of each drill 12 and 14 is suspended generally horizontally from the respective pair of pins 52.

The lock member 60 of each of the drills 12 and 14 is movable between a raised inoperative position and a lowered position in contact with the angle members 36 in response to movement of the respective pairs of transport wheels 46 between their raised position for field operation and the lowered ground-engaging position for endwise transport. This conjoint movement is transmitted through a mechanical linkage best shown in FIGS. 3 and 4. A pin 66 is received through a slot 68 defined through the support arm 62. A bar 70 is somewhat loosely connected at one end to the pin 66 and at its other end to the cylinder-connection pin 56. On the opposite side of the arm 62 a coil spring 72 is connected between the pins 56 and 66. During extension of the cylinder 54 to lower the transport wheel 46 and the lock member 60, the bar 70 and spring 72 will pull the pin 66 against the end of the slot 68 to thus swing the arm 62 downwardly. As the lock member 60 engages the angle members 36 the spring 72 acts as a cushion to prevent undue stress on the actuating linkage.

Figure 5:
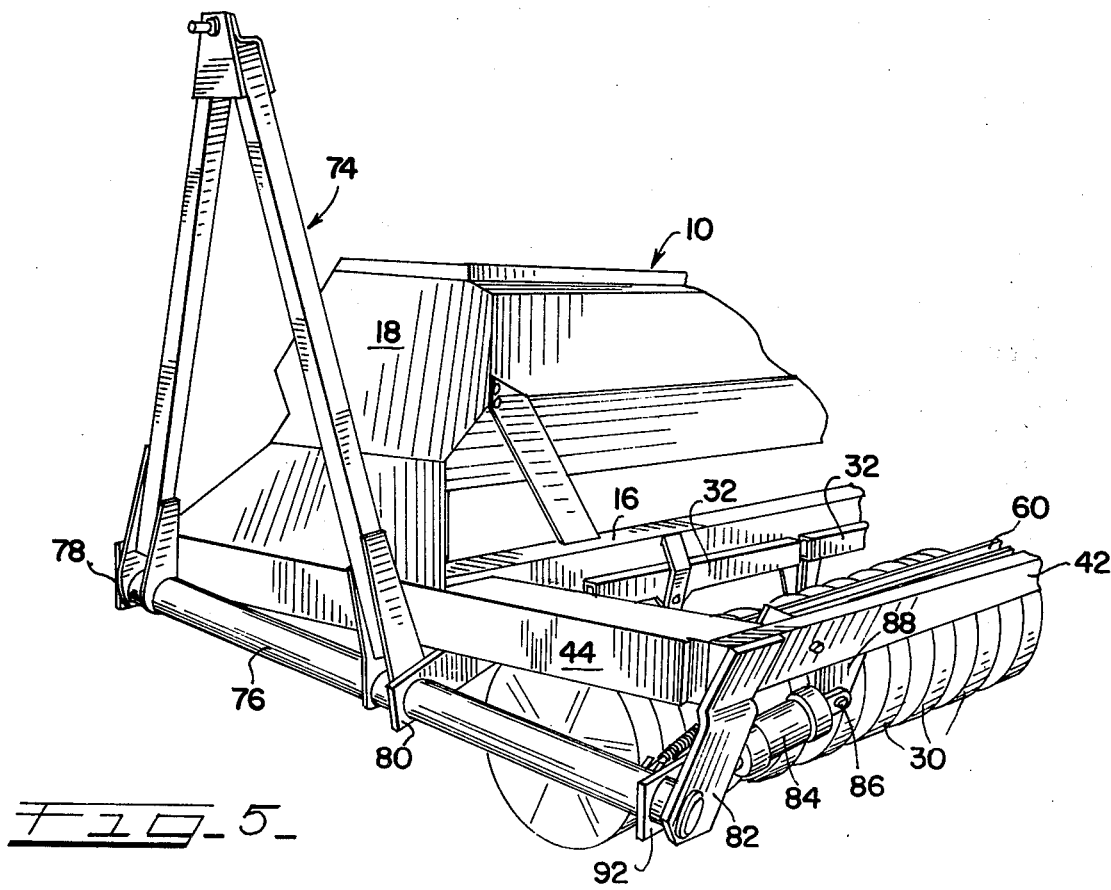
FIG. 5 is a fragmentary perspective view of the lead drill of FIGS. 1 and 2.

Referring again to FIG. 1 it will be seen that the drill 10 is the leading drill in transport in the direction of arrow B. As shown more specifically in FIG. 2 the drill 10 has only one transport wheel 46. It will be understood that the interrelationship of this wheel 46, the hydraulic cylinder 54, support arm 62, and lock member 60 is the same in all respects as described above for drills 12 and 14. Drill 10 differs in that it includes a transport hitch 74 which is interconnected with the lock member 60 for conjoint operation. As best shown in FIG. 5 the hitch 74 includes a rockshaft 76 journalled in plates 78, 80, and 82 welded to the end frame 44. It will be noted that the rockshaft 76 is disposed at an angle relative to the end frame 44 to enhance ground clearance of the press wheels 30 in endwise transport.

The hitch 74 is power-shiftable between its raised position (FIG. 5) for field operation and its lowered position (FIGS. 1 and 2) for endwise transport by a hydraulic cylinder 84. With reference to FIGS. 5, 6, and 7 the hydraulic cylinder 84 is coupled by a pin 86 to a plate 88 welded to the underside of the beam 42. The rod end of the cylinder 84 is connected by a pin 90 to a plate 92 welded to the hitch rockshaft 76.

The end of the locking member 60 proximate to the hitch 74 is suspended from the beam 42 for up and down movement by structure including a support arm 94. A pin 96 is welded to the upper end of the arm 94 and is journalled in the beam 42. Another pin 98 is welded to the lower end of the support arm 94 and projects forwardly through slots (not shown) defined through the spaced flanges of the channel-section lock member 60.

Powered movement of the hitch 74 is transmitted to the lock member 60 through a linkage shown in FIG. 6 and 7. A rod 100 is pinned between a pair of ears 102 welded to the rockshaft 76. A coil spring 104 is secured between the rod 100 and another rod 106 extending toward the support arm 94. The rod 106 includes a slot 108 which receives a pin 110 welded to the support arm 94. It will be seen that extension of the cylinder 84 to shift the hitch 74 to its lowered transport position will swing the arm 94 and member 60 downwardly. The spring 104 acts as a cushion against excess stress in the linkage upon lowering the lock member 60 against the angle members 36.

In field operation the hitch 74 and the transport wheels 46 will of course be retained in their raised positions. The lock members 60 of all the drills will thus be held out of contact with the stone kicker attachments 34. The hydraulic cylinders 54 of the transport wheels 46 and the cylinder 84 of the hitch 74 are hydraulically connected in parallel and powered from the hydraulic system of the towing tractor. Accordingly, conversion to endwise transport is a relatively simple matter of actuating the cylinders to raise the rear of the drills onto the transport wheels 46 while lowering the hitch 74 into connection with the hitch of the pre-positioned tractor. As discussed above, lowering the wheels 46 and hitch 74 simultaneously lowers the lock member 60 against the angle members 36 of the stone kicker attachments. Due to the interconnection of the press wheel gangs the engagement with the angle members 36 prevents any of the gangs from shifting downwardly during transport. For endwise transport the operating hitch 43 is simply swung upwardly to a position within the overall width of the unit.

By the foregoing applicants have provided a drill transport system which is well suited to accomplishing the objects of the invention.

What is claimed is:

1. A transport system for a pair of grain drills coupled together end-to-end for towing in a forward direction for operation and alternatively in an endwise direction for transport, each of said drills having a frame and a caster wheel mounted at the front thereof and a plurality of gangs of press wheels disposed along the rear of the drill frame, said transport system comprising:
   a pair of transport wheels mounted on the rear of the frame of one of said drills for movement between a raised position and a lowered position wherein said one drill is supported for transport entirely on said transport wheels and the respective caster wheel;
   a press wheel gang lock mounted on the frame of said one drill for movement to a position locking the gangs thereof against downward movement;
   means for moving said gang lock to its locking position in response to movement of said transport wheels to their lowered positions;
   a transport wheel mounted on the rear of the frame of the other of said drills for movement between a raised position and a lowered transport position;
   a hitch pivotally mounted on an end of said other drill for movement between a raised position and a transport position wherein the hitch may be coupled to a tractor for towing said drills in endwise direction;
   a press wheel gang lock mounted on the frame of said other drill for movement to a position locking the gangs thereof against downward movement;
   and means for moving the gang lock of said other drill to its locking position in response to movement of said hitch to its transport position, whereby the press wheel gangs of said drills will be retained out of ground contact enabling endwise transport of said drills without damage to the gangs.

2. In a grain drill having a frame and a plurality of side-by-side gangs of press wheels pivotally suspended from the frame for vertical movement relative to the frame; an improved endwise transport system for the drill, comprising:
   a transport wheel mounted on said frame for shiftable movement between a raised position and a transport position;
   an endwise hitch pivotally mounted on said frame for movement between a raised position and a transport position wherein the hitch may be coupled to a tractor for towing the drill in endwise direction;
   a press wheel gang lock mounted on said frame for movement to a position locking said gangs against downward movement;
   and means for moving said gang lock toward its locking position in response to movement of said hitch to its transport position, thereby enabling the gangs of press wheels to be held out of ground contact during transport.

3. In a grain drill having a frame and a plurality of side-by-side gangs of press wheels pivotally suspended from the frame for vertical movement relative to the frame, an improved endwise transport system for the drill, comprising:
   a plurality of transport wheels mounted on said frame for shiftable movement between a raised position for drill operation and a lowered position for drill transport;
   a press wheel gang lock mounted on said frame for movement to a position locking said gangs against downward movement;
   and means for moving said gang lock to its locking position in response to shifting said wheels to their transport positions, whereby the gangs of press wheels will be held out of ground contact during transport.

4. The subject matter of claim 1, wherein said means includes a mechanical linkage operatively connected between said gang lock and said transport wheels, said linkage including resilient means effective to cushion the locking action of the gang lock to minimize stress on said linkage.

5. The subject matter of claim 1, wherein each of said gangs of press wheels includes a stone kicker attachment mounted thereon, said gang locks each including an elongated member shiftable into engagement with said attachments to accomplish said locking step.

6. The subject matter of claim 2, wherein each of said gangs of press wheels includes a stone kicker attachment mounted thereon, said gang lock including an elongated member shiftable into engagement with said attachments to accomplish said locking step.

7. The subject matter of claim 3, wherein each of said gangs of press wheels includes a stone kicker attachment mounted thereon, said gang lock including an elongated member shiftable into engagement with said attachments to accomplish said locking step.

8. In a grain drill of the type having a plurality of gangs of side-by-side press wheels disposed generally along the rear of the drill, an improved transport system for the drill comprising:
   a beam rigidly secured to the drill and extending along the transverse length thereof generally rearwardly of the press wheels;
   a pair of wheel arms pivotally mounted on said beam, said arms being disposed respectively near the opposite ends of said beam;
   a pair of transport wheels journalled respectively on said wheel arms;
   a pair of hydraulic cylinders connected between said beam and said wheel arms respectively for selectively shifting each of said wheels between a raised position and a lowered position for supporting the drill in transport;
   a stone kicker attachment mounted on each of said gangs of press wheels and including an upwardly exposed abutment member;

an elongated lock member movable downwardly into engagement with the abutment members to retain said gangs of press wheels out of ground engagement in transport;

and linkage means interconnecting each of said wheel arms with said lock member for moving said lock member into engagement with the abutment members in response to shifting said wheels to their lowered position for transport.

9. The subject matter of claim 8, wherein said linkage means includes a pair of support arms pivotally supporting said lock member from said beam generally horizontally above said abutment member, said linkage means further including links connecting said wheel arms to said support arms for conjoint movement.

* * * * *